J. CHERPECH.
CABBAGE CUTTING MACHINE.
APPLICATION FILED MAY 16, 1918.

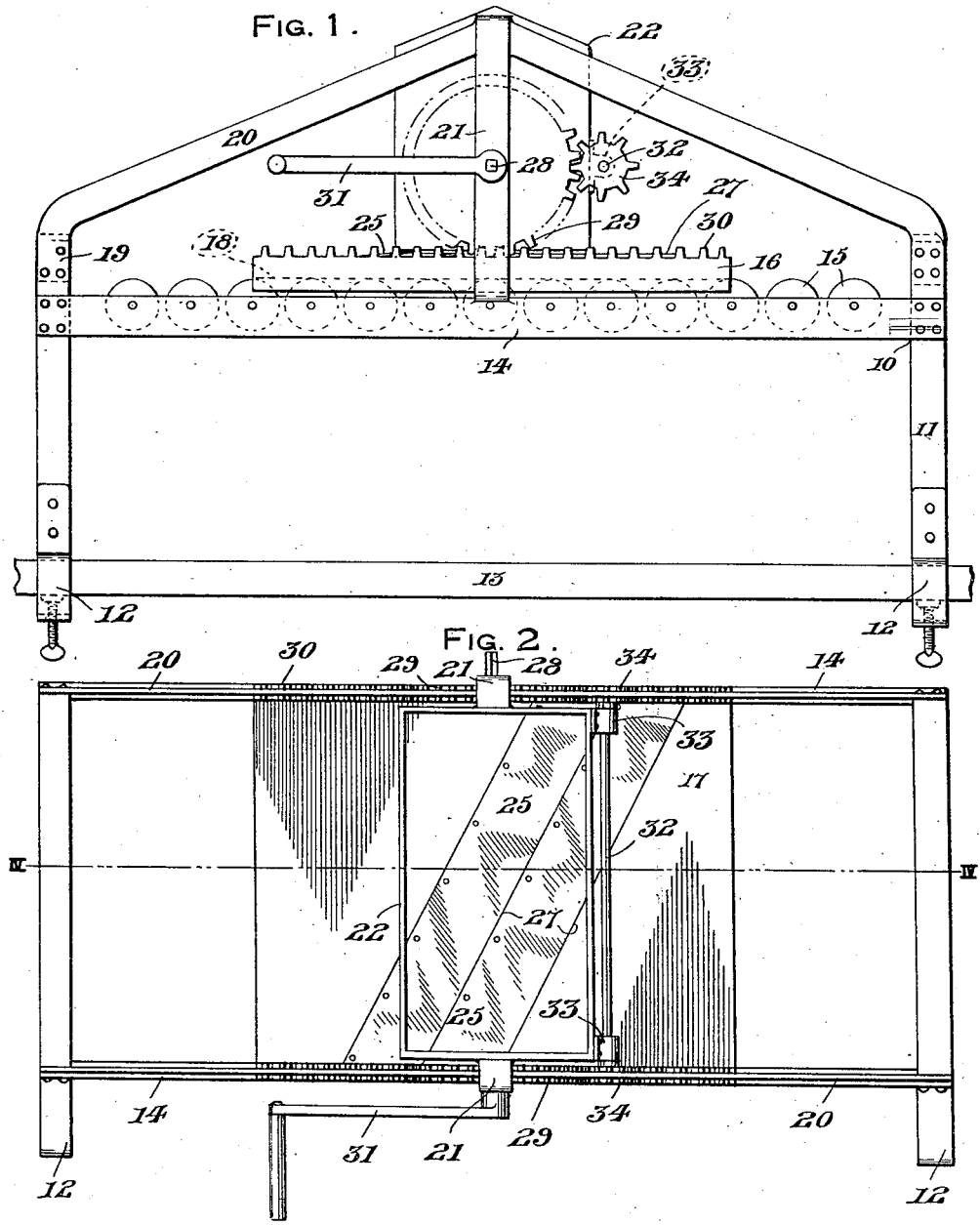

1,283,667.

Patented Nov. 5, 1918.
2 SHEETS—SHEET 2.

Inventor
J. Cherpech

By
Attorney

UNITED STATES PATENT OFFICE.

JOSEPH CHERPECH, OF STAFFORD, ALBERTA, CANADA.

CABBAGE-CUTTING MACHINE.

1,283,667.  Specification of Letters Patent.  Patented Nov. 5, 1918.

Application filed May 16, 1918. Serial No. 234,945.

*To all whom it may concern:*

Be it known that I, JOSEPH CHERPECH, a subject of the Emperor of Austria, residing at Stafford village, in the Province of Alberta and Dominion of Canada, have invented certain new and useful Improvements in Cabbage-Cutting Machines, of which the following is a specification.

The primary object of the invention is the provision of a cutting or shredding device adapted for easily and quickly chopping or cutting such articles as vegetables and meat, the structure possessing great strength and durability.

A further object of the invention is the provision of a cutter especially adapted for shredding cabbage in the preparation of slaw, the cutting means being positive in its operation and driven with great power provided by manually operated means.

A still further object of the invention is the provision of a cutter having a vegetable receptacle and designed for operation at either side thereof whereby the cutters are forcibly impelled at the opposite longitudinal sides of the machine.

In the drawings forming a part of this application and in which like numerals refer to corresponding parts throughout the several views, Figure 1 is a side elevation of the device secured to a support;

Fig. 2 is a top plan view thereof;

Figure 3:
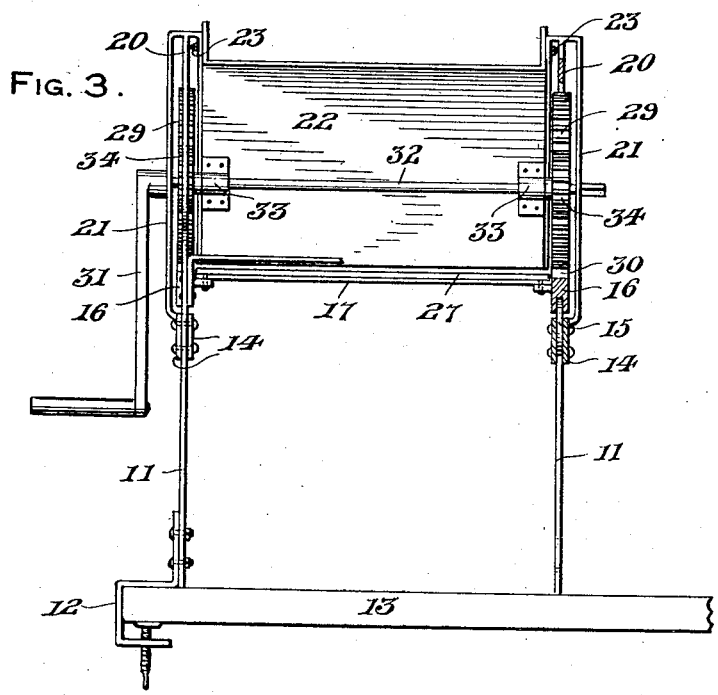
Fig. 3 is a view partly in end elevation and partly in vertical transverse section of the device.

The machine comprises a substantially rectangular frame 10 having corner legs 11 provided with clamps 12 for mounting the device upon any suitable support such as a table or shelf 13.

The frame 10 includes side rails 14 having supporting disks or anti-friction rollers 15 journaled therein for mounting the side racks 16 of a platform 17 longitudinally shiftably of the frame, on the disks or rollers. Grooves 18 are provided upon the bottoms of the racks 16 for receiving the disks 15 whereby the platform 17 may be reciprocated upon the frame 10, its movement being limited by the end portions 19 of the opposite upright sides 20 carried by said frame. Connecting braces 21 are provided at each side of the frame 10 centrally connecting the rails 14 and the upper extremities of the sides 20.

A hopper 22 is secured between the sides 20 by suitable bolts 23 with its open bottom 24 slidably spaced above the platform 17, the said hopper being adapted to receive cabbage or other eatables to be cut by the machine.

A plurality of cutting blades 25 are diagonally arranged upon the platform 17 overlying openings 26 through the platform and being in the form of knives with sharp cutting edges 27 positioned above the plane of the top of the platform 17. A shaft 28 is journaled through each of the braces 21 having a gear 29 thereon in constant mesh with the toothed upper edge 30 of the adjacent rack 16. A crank 31 is adapted for detachable connection with the outer end of either of the shafts 28 which may be found desirable in operating the device.

Figure 4:
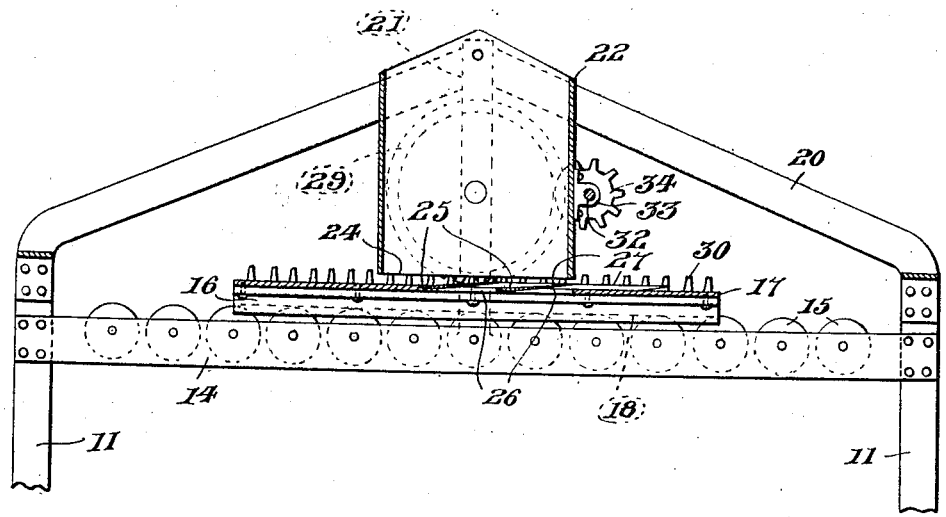
Fig. 4 is a central longitudinal vertical sectional view of the same.

An auxiliary shaft 32 is journaled in brackets 33 carried on one side of the hopper 22 and has a pinion 34 at each end thereof in constant mesh with the said gears 29. From this detailed description of the invention it will be apparent that upon turning the crank 31, the adjacent gear 29 will be revolved and by means of the pinions 34 and shaft 32 will impart revolutions to the opposite gear 29, while this turning of said gears forcibly reciprocates the racks 16 and platform 17 in either desired direction. The said platform 17 is forcibly reciprocated upon the anti-friction disks 15 causing the knives 25 to pass in opposite directions beneath the hopper 22 for cutting the cabbage or other eatables which are placed therein. The cutting operation only takes place during the forward movement of the platform 17 in the direction indicated by the arrow in Fig. 4 of the drawings, but the movements of the platform during the cutting operation are only designed to pass the opposite sides of the hopper 22, it being unnecessary for the platform 17 to travel to the limit of its longitudinal movement so as to contact the end members 19.

Short or long strokes may be given the knives 25 by correspondingly moving the crank 31 so as to give short or long cuts to the cabbage within the hopper 22 with the desired rapidity, it being noted that the diagonal positioning of the said knives assists in the cutting operation. The connecting of the gears 29 by means of the shaft 32 and pinions 34 furnishes a positive drive to both of the racks 16 without the necessity of having a driving shaft extending through the hopper 22 so that the hopper remains unobstructed although providing a positive gear drive for the platform 17 exerting power upon the racks 16 at both sides of the machine when the crank 31 is operated at either side thereof desired.

What I claim as new is:—

1. A vegetable cutter including side rails, rack-bars mounted for reciprocation on said rails, a platform carried by said rack bars, cutting knives carried by said platform, a hopper secured above the platform having an open bottom located slightly above the path of movement of said knives, and simultaneous operating means at opposite sides of the platform.

2. A vegetable cutter including side rails, rack bars mounted for reciprocation on said rails, a platform carried by said rack bars, a cutting knife carried by said platform, a hopper secured above the platform having an open bottom positioned slightly above the path of movement of said knives, driving gears at the opposite sides of the platform in constant mesh with said rack bars, pinions operatively connected between the said gears, and turning means for either of said gears at will whereby the platform is adapted for reciprocation during the cutting operation.

3. A cabbage cutter comprising a frame having spaced rails, upright sides upon said rails between the ends thereof, a hopper secured between said sides above the plane of and centrally between said rails, anti-friction rollers journaled in said rails, grooved rack-bars shiftable longitudinally upon said rollers, a platform carried by said rack bars, cutting knives carried by said platform adapted for passing back and forth beneath the open bottom of the hopper upon the reciprocation of the platform, and simultaneously operable driving gears for the said racks.

4. A cabbage cutter comprising a frame having spaced rails, upright sides upon said rails between the ends thereof, a hopper secured between said sides above the plane of and centrally between said rails, rollers journaled in said rails, grooved rack-bars shiftable longitudinally upon said rollers, a platform carried by the said rack-bars, cutting knives carried by said platform adapted for passing back and forth beneath the open bottom of the hopper upon the reciprocation of the platform, vertical braces centrally connecting the said rails and sides, a gear for each of said rack bars journaled upon the adjacent brace, a shaft carried by one side of the hopper, pinions at the ends of said shaft meshing with said gears, and an operating crank adapted for turning either of said gears at will.

In testimony whereof I affix my signature.

JOSEPH CHERPECH.

Copies of this patent may be obtained for five cents each, by addressing the "Commissioner of Patents, Washington, D. C."